United States Patent
Khairallah et al.

(10) Patent No.: US 6,744,820 B1
(45) Date of Patent: Jun. 1, 2004

(54) COMMUNICATION SYSTEM AND METHOD UTILIZING MESSAGE FRAMES HAVING MULTIPLE THRESHOLDS FOR A MULTI-DEVICE VEHICLE OCCUPANT PROTECTION SYSTEM

(75) Inventors: Farid Khairallah, Farmington Hills, MI (US); Russell J. Lynch, West Bloomfield, MI (US); Roger A. McCurdy, Troy, MI (US); Keith R. Miciuda, Grosse Point Park, MI (US); Jon K. Wallace, Redford, MI (US); Scott E. Kolassa, Canton, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/528,974

(22) Filed: Mar. 21, 2000

(51) Int. Cl.$^7$ .............................. H04B 3/00; B60Q 1/00
(52) U.S. Cl. ...................................... 375/257; 340/438
(58) Field of Search ................................ 375/257, 219; 340/438; 307/40, 10

(56) References Cited

U.S. PATENT DOCUMENTS

| | | | | |
|---|---|---|---|---|
| 4,176,250 A | * | 11/1979 | Berglind ..................... 370/212 |
| 4,540,890 A | * | 9/1985 | Gangemi et al. ............ 307/40 |
| 5,142,278 A | * | 8/1992 | Moallemi et al. ........... 340/436 |
| 5,473,635 A | * | 12/1995 | Chevroulet ................. 375/287 |
| 5,499,269 A | | 3/1996 | Yoshino |
| 5,760,489 A | * | 6/1998 | Davis et al. ............... 307/10.1 |
| 5,784,472 A | * | 7/1998 | Ney et al. .................... 381/86 |
| 6,070,687 A | * | 6/2000 | Wallace et al. ............ 180/287 |
| 6,188,314 B1 | * | 2/2001 | Wallace et al. ............ 340/438 |
| 6,341,252 B1 | * | 1/2002 | Foo et al. .................... 701/45 |

OTHER PUBLICATIONS

Bosch/Temic presentation materials, 13 pages, presented at USCAR Aug. 1999.
Philips Semiconductors presentation materials, 26 pages, presented at USCAR Aug. 1999.
Siemens presentation materials, 30 pages, presented at USCAR Aug. 1999.

* cited by examiner

*Primary Examiner*—Stephen Chin
*Assistant Examiner*—Lawrence Williams
(74) *Attorney, Agent, or Firm*—Tarolli, Sundheim, Covell & Tummino L.L.P.

(57) ABSTRACT

A communication system (10) includes a communication bus (16) through which a power/voltage transmitter (44) conveys electrical energy and messages to a plurality of units (18, 20). The power/voltage transmitter (44) includes components for adjusting voltage of the electrical energy past a first predetermined threshold to provide a first type message frame and modulating the voltage of the electrical energy during the first type message frame to convey a first type message. The power/voltage transmitter (44) also includes components for adjusting the voltage past a second predetermined threshold to provide a second type message frame and modulating the voltage of the electrical energy during the second type message frame to convey a second type message.

22 Claims, 5 Drawing Sheets

(HIGH SIGNAL WITH DROP TO MESSAGE)

(LOW SIGNAL WITH RISE TO MESSAGE)

COMMUNICATION SYSTEM AND METHOD UTILIZING MESSAGE FRAMES HAVING MULTIPLE THRESHOLDS FOR A MULTI-DEVICE VEHICLE OCCUPANT PROTECTION SYSTEM

TECHNICAL FIELD

The present invention is generally directed to a communication system and method of a vehicle occupant protection system. Specifically, the present invention is directed to communication within a distributed protection system.

BACKGROUND OF THE INVENTION

As the sophistication of vehicle occupant protection systems has increased, the number and complexity of vehicle occupant protection devices within the protection systems has increased. In response to the increased number of devices, there has been a movement toward centralized information processing and/or control of the devices within the protection systems to reduce cost and increase reliability. This change in the design approach for protection systems has brought about a need to design new arrangements for communication.

In one known type of system, a communication bus interconnects a central unit and a plurality of remote units. Electric signals pass through the communication bus. However, under certain conditions, the electric signals create unwanted radio frequency emissions that permeate areas adjacent to the communication bus.

SUMMARY OF THE INVENTION

In accordance with one aspect, the present invention provides a communication system. The system includes an electrical conductor that interconnects a plurality of units for conducting electrical energy. Energy supply means provides electrical energy, which has a voltage, onto the conductor. Voltage messaging means modulates the voltage to convey messages from a first unit to a second unit via the conductor. Voltage receiver means monitors the voltage of the electrical energy to discern messages from the first unit. The voltage messaging means includes means for adjusting the voltage of the electrical energy past a first predetermined threshold to provide a first type message frame and for modulating the voltage of the electrical energy during the first type message frame to convey a first type message. The voltage messaging means includes means for adjusting the voltage of the electrical energy past a second predetermined threshold to provide a second type message frame and for modulating the voltage of the electrical energy during the second type message frame to convey a second type message.

In accordance with another aspect, the present invention provides an occupant protection system for protecting a vehicle occupant. The system includes an actuatable occupant protection device for protecting the vehicle occupant. A central unit controls actuation of the protection device and provides power for use by the protection device. The protection device is located remote from the central unit. An electrical conductor interconnects the central unit and the protection device for conducting electrical energy. The central unit includes energy supply means for providing electrical energy, that has a voltage, onto the conductor and includes voltage messaging means for modulating the voltage to convey messages from the central unit to the protection device. The protection device includes voltage receiver means for monitoring the voltage of the electrical energy to discern messages from the central unit. The voltage messaging means includes means for adjusting the voltage of the electrical energy past a first predetermined threshold to provide a first type message frame and for modulating the voltage of the electrical energy during the first type message frame to convey a first type message. The voltage messaging means includes means for adjusting the voltage of the electrical energy past a second predetermined threshold to provide a second type message frame and for modulating the voltage of the electrical energy during the second type message frame to convey a second type message.

In accordance with another aspect, the present invention provides a method of communicating between a plurality of units. Electrical energy, that has a voltage, is provided onto a conductor that interconnects the units. The voltage of the electrical energy is adjusted past a first predetermined threshold to provide a first type message frame from a first unit. The voltage of the electrical energy is modulated during the first type message frame to convey a first type message from the first unit to the second unit. The voltage of the electrical energy is adjusted past a second predetermined threshold to provide a second type message frame from the first unit. The voltage of the electrical energy is modulated during the second type message frame to convey a second type message from the first unit to the second unit. The voltage of the electrical energy is monitored at the second unit to discern the message frames and the messages from the first unit.

BRIEF DESCRIPTION OF THE DRAWINGS

The foregoing and other features and advantages of the present invention will become apparent to one skilled in the art upon consideration of the following description of the invention and the accompanying drawings, in which.

DESCRIPTION OF PREFERRED EMBODIMENT

Figure 1:
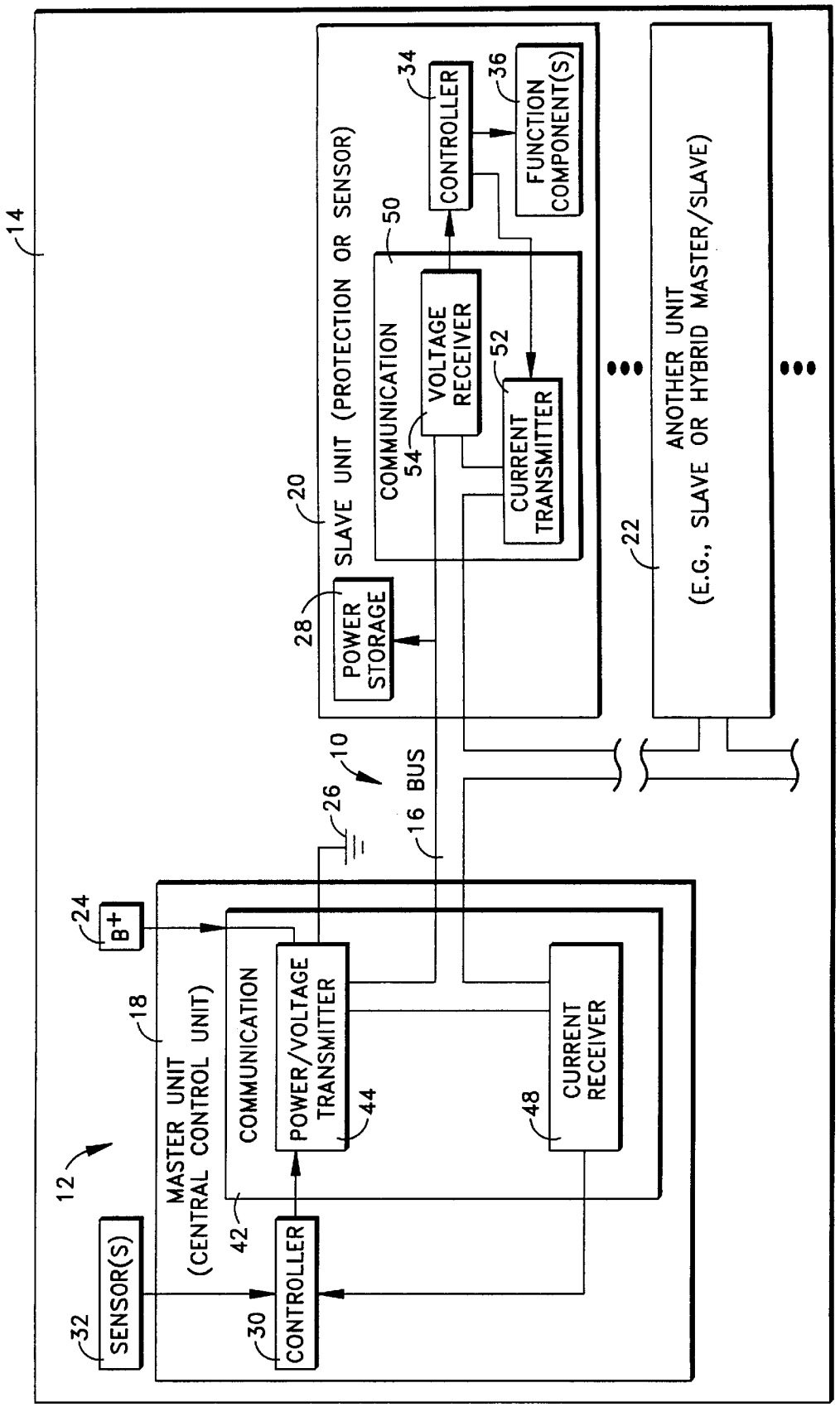
FIG. 1 is a block diagram of a vehicle occupant protection system having a communication system in accordance with the present invention, and within a schematically shown vehicle.

One representation of the present invention is schematically shown in FIG. 1 as a communication and energy distribution system 10 for a vehicle occupant protection system 12. The occupant protection system 12 is for a vehicle 14 (schematically shown) and helps to protect one or more vehicle occupant(s) (not shown) in the event of a vehicle condition for which it is desired to protect the vehicle occupant(s). For example, the occupant protection system 12 helps protect the occupant(s) during a vehicle collision and during a vehicle rollover. Hereinafter, the occupant protection system 12 is referred to as the protection system 12, and the energy distribution and communication system 10 is referred to as the communication system 10, for brevity.

The protection system 12 is a distributed system, in that at least some of the components of the protection system are located remote from other components of the protection system. An energy transfer and communication bus 16 (hereinafter "the bus 16") of the communication system 10 interconnects the components of the protection system 12. The bus 16 includes at least one electrical conductor, such as a metal wire, along which electrical energy can flow to convey messages and to transfer electrical power.

The components of the protection system 12 include a master unit 18 and at least one slave unit 20. Additional component(s) (e.g., another unit 22) of the protection system 12 include one or more additional slave unit(s) and/or one or more hybrid master/slave unit(s). A hybrid master/slave unit has a combination of attributes like the master unit 18 and attributes like the slave unit 20.

The designations of "master" and "slave" are directed to the aspect of which components (e.g., a master) provide commands within the protection system 12, and which components (e.g., a slave) are responsive to such commands. The designations of "master" and "slave" also indicate how electrical energy is distributed within the protection system 12. Specifically, the master unit 18 supplies electrical energy to power the slave unit(s) 20 and the other unit(s) 22 (e.g., hybrid master/slave unit(s), if any present).

The master unit 18 is connected to a source 24 of electrical energy, such as a battery of the vehicle 14, through suitable power regulation means, and is also connected to electrical ground 26 of the vehicle. The slave unit(s) 20 and the other unit(s) 22 are not directly connected to the source 24 of electrical energy. Each slave unit 20 includes a power storage component 28 that is connected to the bus 16 to receive energy via the bus for use within the slave unit. Each other unit 22 has a similar component (not shown) connected to the bus 16 to receive energy via the bus.

Turning now to the functional details of the components of the protection system 12, the master unit 18 can be referred to as a central control unit. The master unit 18 has a controller 30 with a processor, which executes a program (e.g., an algorithm), and/or with "hard-wired" circuitry to process information to make determinations for the protection system 12. Commands from the master unit 18 that are intended for the slave unit(s) 20 and the other unit(s) 22 of the protection system 12 are based upon the determinations made within the controller 30.

One function of the controller 30 is to process information indicative of vehicle operation and/or vehicle occupant characteristic(s) to determine whether a need exists to provide protection to one or more vehicle occupants. The information indicative of vehicle operation and/or vehicle occupant characteristic(s) is provided to the controller 30 via the communication system 10 and/or one or more sensor(s) 32 that are operatively connected to the controller. In one embodiment, the sensor(s) 32 include an acceleration sensor for detecting sudden vehicle deceleration such as would occur during a vehicle collision.

Another function of the controller 30 is to process information for diagnostic procedures within the protection system 12. The information needed for the diagnostic procedures is provided to the controller 30 via the communication system 10 in response to commands from the master unit 18 for diagnostic information from the slave unit(s) 20 and the other unit(s) 22.

Each slave unit 20 performs a commanded function within the protection system 12. Preferably, each slave unit 20 includes a controller 34 for handling messages and function component(s) 36 for performing commands conveyed via messages. It is to be appreciated that the controller 34 may merely be capable of recognizing addresses, responding to pre-defined messages, and issuing pre-defined messages. In other words, the controller 34 may be a "limited intelligence" component.

Preferably, at least one slave unit 20 is an actuatable occupant protection device. Each occupant protection device may be any suitable type of protection device. Examples of occupant protection devices include: an inflatable air bag device, an inflatable knee bolster device, an inflatable seat belt device, an inflatable headliner device, an inflatable side curtain device, a seat belt retractor lock device, a seat belt pretensioner device, and a D-ring height adjuster device.

It will be appreciated that upon the occurrence of a vehicle condition indicative of a situation in which a vehicle occupant is to be protected (e.g., a predetermined type of vehicle collision), the master unit 18 provides a signal requesting actuation of the occupant protection slave(s) unit 20 to help protect the occupant. In an example in which one slave unit 20 is an air bag module, the function component(s) 36 include an air bag, a source of inflation fluid and a firing circuit. When actuated, the firing circuit causes the source of inflation fluid to inflate the air bag.

It is to be appreciated that some or all of the slave unit(s) 20 may be sensor devices. The function component(s) 38 would accordingly be for sensory perception. Further, such sensor slave unit(s) 20 could have "limited intelligence." An example of a sensor slave unit includes an accelerometer. Also, it is to be appreciated that some or all of the other unit(s) 22 may be protection devices or sensor devices.

It is to be noted that any suitable number of slave unit(s) 20 and the other unit(s) 22 may be present. It is to be noted that the functions of the slave unit(s) 20 and the other unit(s) 22 may include other features. Hereinafter, the slave unit(s) 20 and the other unit(s) 22 are referred to as the slave unit 20 (singular) and the other unit 22 (singular), respectively, for simplicity, but with the understanding that plural slave units and/or plural other units may be present and that various/other function(s) may be performed. Moreover, hereinafter, the communication aspect is discussed in greater detail via example. However, it is to be understood that the present invention is not limited to the discussed example.

In order for the master unit 18 to communicate and to supply power via the bus 16, the communication system 10 includes a communication portion 42 that is part of the master unit. A power/voltage transmitter 44 of the communication portion 42 is connected to the electrical source 24 and ground 26. The power/voltage transmitter 44 is also operatively connected to the controller 30 and to the bus 16. One function of the power/voltage transmitter 44 is to provide electrical energy onto the bus 16 as a supply of electrical energy for the slave unit 20 and the other unit 22. A second function of the power/voltage transmitter 44 is to output voltage modulation signals onto the bus 16 to convey messages (e.g., commands) from the master unit 18.

It is to be appreciated that any type of voltage modulation may be utilized. In the illustrated example, the voltage is modulated (see FIG. 2) by the master unit 18 to have signal portions below a signal threshold value (e.g., a lower voltage level to represent logic LOW) and signal portions above the signal threshold value (e.g., a higher voltage level to represent logic HIGH). Further, the voltage-modulated message is comprised of a series of bit segments.

Preferably, the modulation is pulse-width-modulation (PWM). Each bit comprises a logic LOW portion and a logic HIGH portion. In other words, within each bit segment, the voltage is modulated to provide a pulse at the logic HIGH voltage value. The duration of the pulse at the logic HIGH voltage value has either a first duration or a second duration. The first pulse duration represents a binary zero, and the second pulse duration represents binary one. Each bit segment is defined to end on a falling edge of a pulse. Accordingly, the voltage mode communication is serially transmitted and digital.

The communication portion 42 (FIG. 1) of the master unit 18 also includes a current receiver 48 that is operatively connected to the controller 30 and to the bus 16. The current receiver 48 receives messages from the bus 16 that are conveyed via current modulation (see FIG. 2). Such current-modulation messages are placed onto the bus 16 (FIG. 1) by the slave unit 20 or the other unit 22. Thus, it is to be noted that the communication portion 42 of the master unit 18 sends messages via voltage modulation and receives messages via current modulation.

In order for the slave unit 20 to communicate, the communication system 10 includes a communication portion 50 that is part of the slave unit. A current transmitter 52 of the communication portion 50 is operatively connected to the controller 34 and to the bus 16. The current transmitter 52 modulates current on the bus 16 to send messages to the master unit 18.

A voltage receiver 54 of the communication portion 50 is operatively connected to the controller 34 and to the bus 16. The voltage receiver 54 receives voltage modulation signals placed on the bus 16 by the master unit 18. Thus, it is to be noted that the communication portion 50 of the slave unit 20 sends messages via current modulation and receives messages via voltage modulation.

Figure 2:
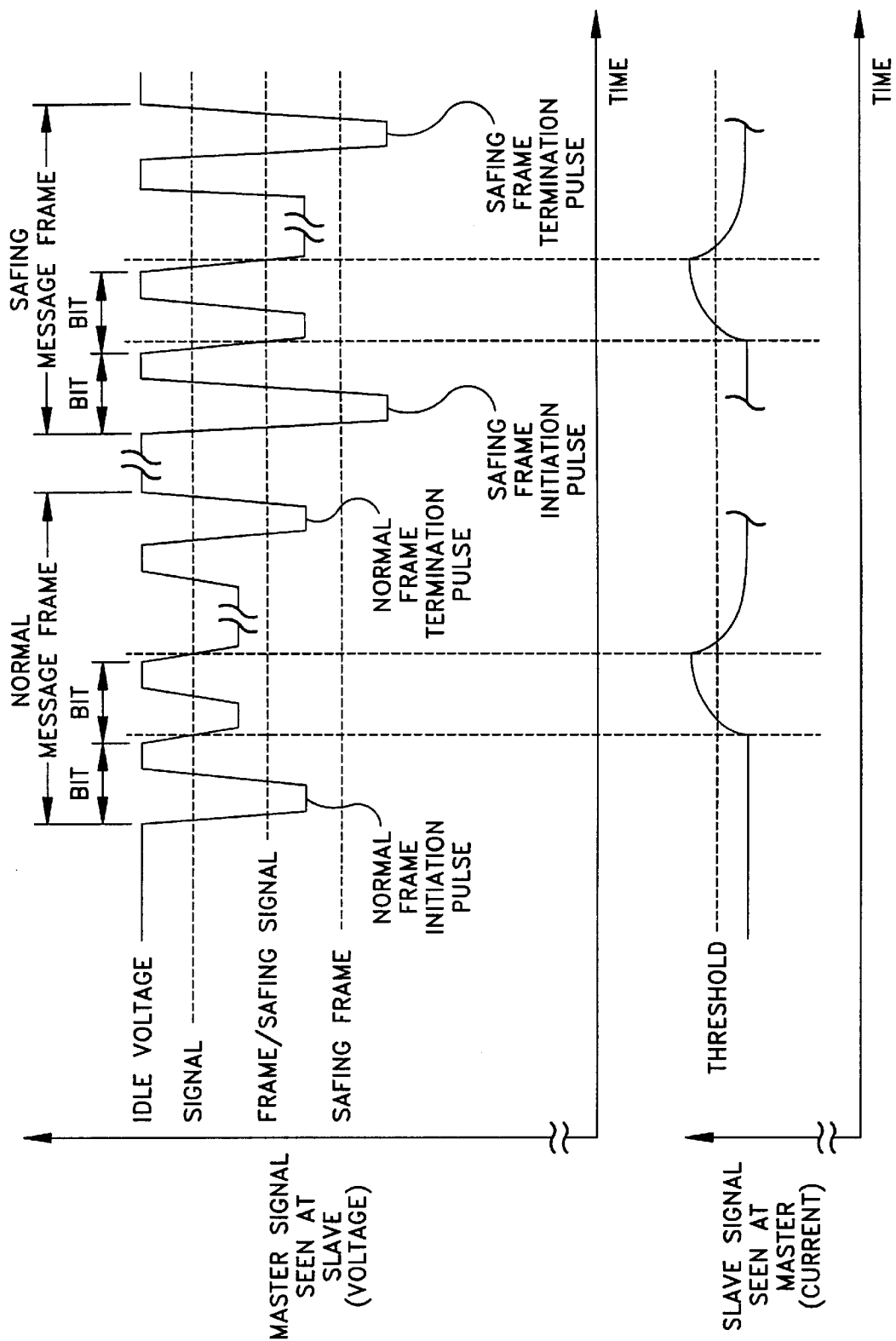
FIG. 2 is an illustration of plots showing two types of voltage communication and a current communication that occur on a communication bus of the communication system of FIG. 1.

Turning now to the operation of the communication system 10, when communication is not occurring (e.g., communication signals are not being transmitted along the bus 16) the communication system "idles." During idle, the power/voltage transmitter 44 of the master unit 18 provides electrical energy on the bus 16 with a non-modulating voltage (see FIG. 2). The voltage of the electrical energy on the bus 16 during the idle period is referred to as an idle voltage. As shown in FIG. 2, the idle voltage is at a first predetermined voltage level that is a relative high level. During the idle time, the power storage component 28 (FIG. 1) of the slave unit 20 accepts and stores electrical energy.

Focusing on the communication periods (e.g., non-idle periods), the communication that occurs on the bus 16 can be full duplex or half-duplex. Specifically, communication via voltage modulation (i.e., from the master unit 18) and current modulation (i.e., from the slave unit 20) can occur simultaneously. Also, communication via voltage modulation (i.e., from the master unit 18) can occur without simultaneous current modulation communication.

The master unit 18 generally controls certain aspects with respect to the occurrence of a communication period on the bus 16. Specifically, in order for communication to occur on the bus 16, the master unit 18 provides a message frame (see FIG. 2). Each message frame is initiated by adjusting the voltage on the bus 16 past a predetermined threshold voltage value, and that message frame is ended by again adjusting the voltage on the bus past that predetermined threshold voltage value.

It is to be appreciated that any form of voltage adjustment past a predetermined threshold may be utilized to provide the initiation and termination of the message frame. For example, the voltage value is lowered or raised past a predetermined frame threshold value to a new level to initiate the message frame. Voltage modulation occurs from the new level to convey the message, but the voltage is kept below or above the fame threshold value during the message frame. The message frame ends when the voltage value is again brought past (e.g., raised or lowered accordingly) the frame threshold value.

In another example, the voltage value is temporarily lowered or raised past a frame threshold value for initiation and termination of the message frame. The modulation of the voltage to convey the message does not cross the frame threshold value. The illustrated example (see FIG. 2) is the temporary adjustment type. Specifically, the voltage is temporarily lowered past a frame threshold value to initiate a message frame and is temporarily lowered past the frame threshold value to terminate the message frame. The temporary lowering of the voltage is accomplished via a predetermined first bit that is transmitted such that the logic LOW voltage portion of the bit falls below the frame threshold value.

The lowering of the voltage from the idle voltage value to begin the message window serves as an indication to all the units (e.g., an indication from the master unit 18, FIG. 1, to the slave unit 20 and the other unit 22) that the idle period has ended and that a message is about to be placed on the bus 16. Thus, the units of the communication system 10 ignore minor voltage fluctuations about the idle voltage that may occur while the communication system is in the idle mode. Such voltage fluctuation can occur via noise on the bus 16. The signal-to-noise ratio of the communication is higher because the components of the protection system 12 only participate in communication when the master unit 18 has provided the message frame.

The master unit 18 controls the length of the message frame. Thus, the number of bit segments (see FIG. 2) is variable. Accordingly, the length of the messages is variable, and may be of any desired length. In other words, the message length may be changed for each message. Preferably, communication in the voltage mode is asynchronous in that the master unit 18 can transmit at will, regardless of whether current mode communication is occurring.

In accordance with the present invention, two types of message frames are provided. A first type of message frame is a normal communication message frame for normal (e.g., non-critical) communication. A second type of message frame is high priority message frame for important (e.g., safing) communication. In one example, the high priority message frame is a critical communication message frame. Hereinafter, the second type of message frame is referred to as the safing message frame.

The normal (i.e., first type) message frame is denoted by the voltage being adjusted (e.g., lowered) past a first frame threshold value (e.g., a normal frame threshold value). The safing (e.g., second type) message frame is denoted by the voltage being adjusted (e.g., lowered) past a second frame threshold value (e.g., a safing frame threshold value). In the illustrated example, the normal frame threshold value has a higher voltage value than the voltage value of the safing frame threshold value.

Utilizing two types of message frames can serve as an alert to the slave unit 20 and the other unit 22 of the importance of the message being transmitted. In the illustrated example, the first type of message is normal or routine communication, such as diagnostics. The second type of communication is of greater importance such as a safing function communication for the slave unit 20 that is an initiator.

The greater change in voltage that signifies the more important safing message frame also helps to ensure that the slave unit 20 is alerted to the forthcoming message. Specifically, for a safing frame message, the adjustment of the voltage to pass the safing frame threshold value inherently includes passage of the normal frame threshold value. At the bare minimum, the slave unit 20 is alerted to the forthcoming message when the voltage passes the normal frame threshold value as the voltage adjustment proceeds on toward the safing frame threshold value.

In accordance with another aspect of the present invention, the modulation that occurs for the first type of message (i.e., the normal message) is different from the modulation that occurs for the second type of message (i.e., the safing message). In the illustrated example, the amplitude of the modulation for the normal message is less that the amplitude of the modulation of the safing message.

In the illustrated example, the logic HIGH of the safing message has the same voltage amplitude as the voltage value of the logic HIGH of the normal message. However, the logic LOW of the safing message has a lower voltage value than the voltage value of the logic LOW of the normal message. Specifically, the logic LOW of the second message type is below a second signal threshold value, and the second signal threshold value is lower that the first threshold signal value. Herein, the second signal threshold is referred to as the safing signal threshold. In the illustrated example, the second threshold signal value is the same as the normal frame threshold value.

Utilizing two types of message frames and the associated two types of messages can serve as a means to minimize the amount of electromagnetic ("EM") emission that radiates out from the communication system 10. Specifically, the bulk of communication that occurs within the communication system 10 is composed of normal messages. Thus, most of the communication is accomplished via use of the lower amplitude modulation. The lower amplitude modulation causes a lesser amount of EM emission than the higher amplitude modulation.

In addition, the greater change in voltage that is used to provide the safing message also ensures that the slave unit 20 is alerted to the importance of the message. In addition, the message is less likely to be lost or obscured by noise on the bus 16 because of the higher amplitude of the modulation.

Still further, because each large amplitude modulation of the safing message must inherently pass the normal message threshold value in order to pass the safing message threshold value, a redundant reception of the message can occur. Specifically, the safing message can be received by the same method/structure for reception of the normal message in addition to the reception by the method/structure for the safing message. This redundancy provides for insurance that the important second message type is received.

Turning to the current signals, such signals are created via modulation of the amount of current on the bus 16 above/below a threshold value. For current mode messages from the slave unit 20 (FIG. 1), the current transmitter 52 varies the amount of current flowing on the bus 16. Preferably, the current transmitter 52 includes a current sink device to vary the current draw.

A sequence of data bit segments occurs during the current-mode communication, and each data bit has a binary value that is dependent upon the current draw value on the bus 16. Specifically, a first range of current draw values (e.g., below the threshold value) is indicative of logic LOW and a second range of current draw values (e.g., above the threshold value) is indicative of logic HIGH. For each data bit segment, a binary zero is represented by logic LOW at a predetermined point within the data bit segment. A binary one is represented by logic HIGH at the predetermined point with the data bit segment. Thus, the current mode communication is digital and serial.

As noted above, the current mode communication occurs simultaneously with the voltage mode communication. Thus, the current mode communication occurs during either of the message frames (i.e., normal and safing). The current transmitter 52 within the slave unit 20 does not require an accurate internal clocking device to clock modulation of the current to provide the data bits of the current mode communication. Instead, the current transmitter relies upon the voltage data that is being simultaneously transmitted across the bus 16 to clock the current modulation data. Specifically, current mode bit segments are defined by the falling voltage edges.

A falling voltage edge occurs at the beginning and end of the message frame and each pulse within the message frame. Specifically, each current mode bit segment starts/ends when the voltage falls below a message threshold voltage value (either the normal message signal threshold value or a safing message threshold value). The use of the pulse width modulation of the voltage mode communication to clock the current mode communication results in automatic synchronization of the baud rate.

The current transmitter 52 (FIG. 1) can change the data value being sent onto the bus 16 at each falling edge of the pulse width modulated voltage signal. At the current receiver 48 of the communication portion 42 of the master unit 18, the current value on the bus 16 is latched by the current receiver at each falling edge of the modulated voltage signal. Accordingly, the current receiver 48 latches the current draw value just as the power/voltage transmitter 44 is about to switch to end the voltage-mode communication bit.

As a further aspect of the current modulation communication, the provision of each sequence of current-mode communication bits is done via a non-return to zero format. Accordingly, when the current transmitter 52 is sending a plurality of sequential data bits that are the same (e.g., two or more data bits that are all binary one), the current transmitter can maintain the current draw on the bus 16 at the value indicative of the binary value without returning to a neutral value or a zero value. This has the benefit of speeding communications along the bus 16.

Figure 3:
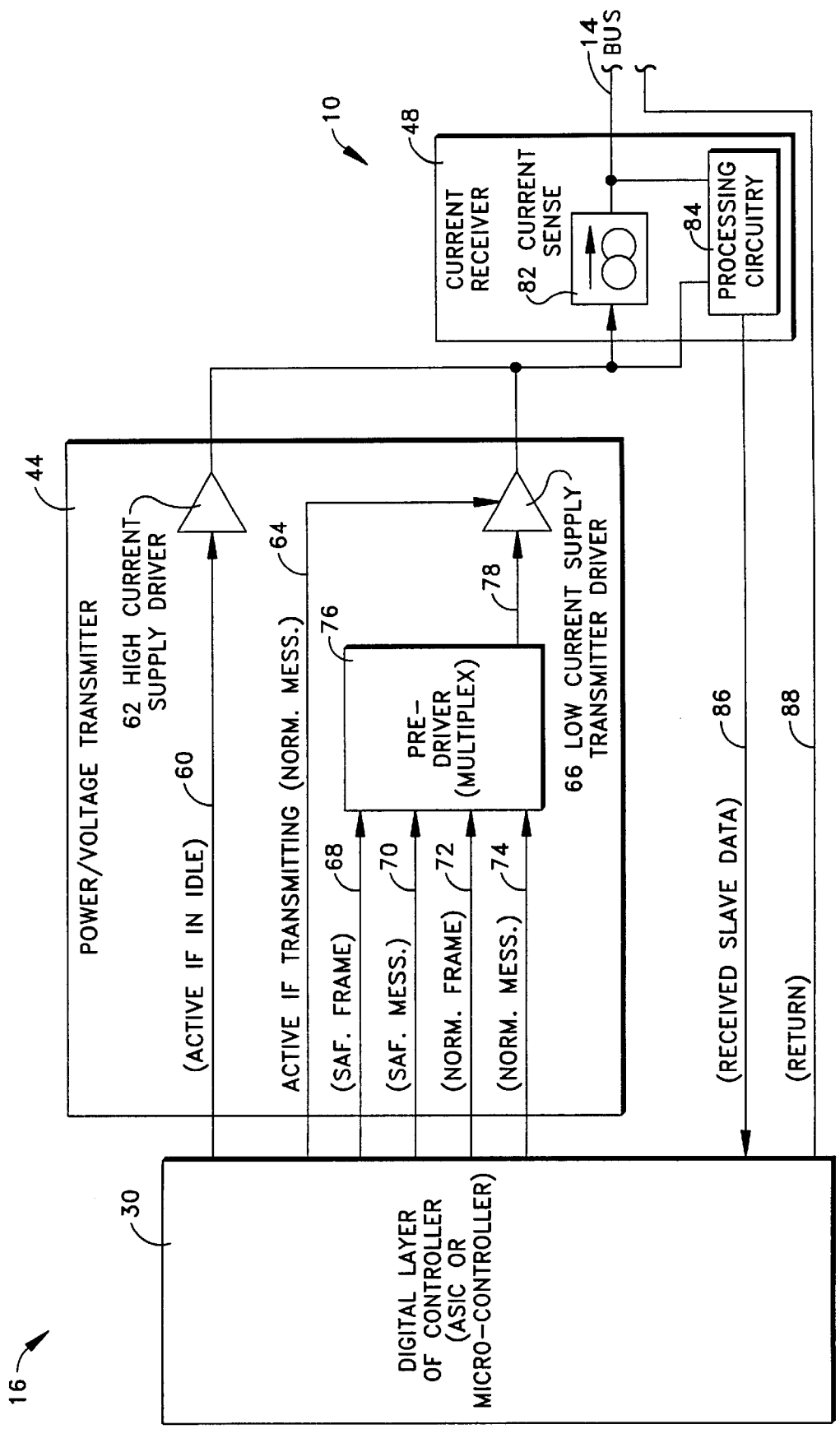
FIG. 3 is a block diagram showing details of a master unit of the communication system of FIG. 1.

FIG. 3 illustrates an example of components within the master unit 18. Specifically, a digital layer of the controller 30 has a plurality of inputs and outputs. A series of outputs is provided to the power/voltage transmitter 44.

A first output 60 is connected to a high current supply driver 62 of the power/voltage transmitter 44. Preferably, the high current supply driver 62 includes an amplifier. A signal provided on the first output 60 is active when the communication system 10 is idling. As will be recalled, electrical energy is provided at a predetermined idle voltage level during idle. Accordingly, the output of the high current supply driver 62 provides the idle voltage.

A second output 64 of the digital layer of the controller 30 is connected as a control to a low current supply transmitter driver 66 of the power/voltage transmitter 44. Preferably, the low current supply transmitter driver 66 includes an amplifier. A signal on the second output 64 is active when the master unit 18 is transmitting a voltage mode signal. Thus, the low current supply transmitter driver 66 is only active or ON during voltage mode communication.

The third through sixth outputs 68–74 from the digital layer of the controller 30 are connected to a pre-driver circuit 76. The pre-driver circuit 76 operates as a multiplexer and provides an output 78 that is input to the low current supply transmitter driver 66. The third output 68 conveys a safing frame signal that indicates that the first and last bit of the massage have logic LOW levels below the safing message frame threshold. The fourth output 70 is a modulated signal that conveys the data bits of the safing message.

The fifth output 72 conveys a normal frame signal that indicates that the first and last bit of the massage have logic LOW levels below the normal message frame threshold. The sixth output 74 is a modulated signal that conveys the data bits of the normal message. The third through sixth outputs 68–74 are "combined" in the pre-driver circuit 76 and the resultant output signal 78 is provided to the low current supply transmitter driver 66.

A current sense component 82 of the current receiver 48 is located on the bus 16, and the two end nodes of the current sense component are connected to processing circuitry 84 of the current receiver. The processing circuitry 84 outputs a digital signal 86. The signal 86 is an input to the digital layer of the controller 30, and is indicative of the amount of current on the bus 16. Preferably, the processing circuitry 84 includes a comparator, an amplifier, and a filter. A return line 88 of the bus 16 is connected to the digital layer of the controller 30.

Figure 4:
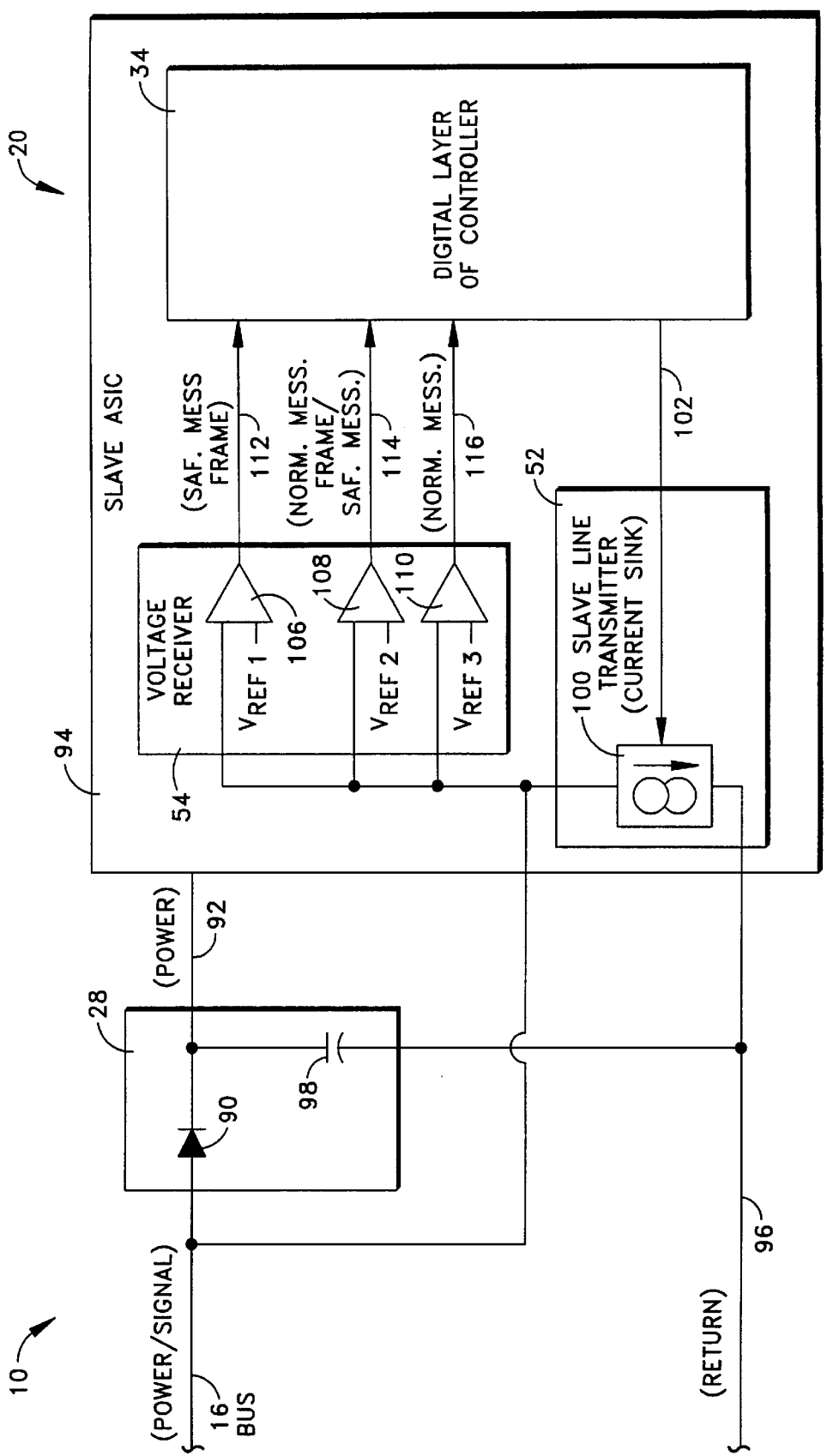
FIG. 4 is a block diagram showing details of a slave unit of the communication system of FIG. 1.

FIG. 4 illustrates an example of components within the slave unit 20. A diode 90 is connected between a node on the bus 16 and a power line 92 that extends to an application-specific integrated circuit (ASIC) 94 within the slave unit 20. A return line 96 is connected to the ASIC 94. A capacitor 98 is connected between the power line 92 and the return line 96. The diode 90 and the capacitor 98 form the power storage component 28.

When the communication system 10 is idling, the capacitor 98 is charged. The energy stored in the capacitor 98 is used to power the slave unit 20 when the communication system 10 is engaged in communication. The diode 90 prevents energy from the capacitor 98 from flowing back onto the bus 16.

A digital layer of the controller 34 may be part of the ASIC 94 and has a plurality of inputs and outputs. A slave line driver current sink 100 of the current transmitter 52 is connected along the bus 16. A slave response control signal 102 is provided by the digital layer of the controller 34 to the current sink 100. The current sink 100 varies the amount of current on the bus 16 in response to slave response control signal 102 from the digital layer. The slave response control signal 102 is modulated in a sequence to provide current draw indicative of logic low and logic high.

The voltage receiver 54 contains three voltage comparators 106, 108, and 110 that are connected to the bus 16 in parallel. Each comparator (e.g., 106) makes a comparison to a predetermined threshold voltage and outputs a signal (e.g., 112) dependent upon the comparison. The first comparator 106 has a reference voltage input that is set at the safing frame voltage level. The output 112 of the first comparator 106 is indicative of the occurrence of a safing frame.

The second comparator 108 has a reference voltage input that is set at the normal message frame threshold/safing message threshold voltage level. The output 114 of the second comparator 108 is indicative of the occurrence of a normal message frame or data bits within the safing message. The third comparator 110 has a reference voltage input that is set at the normal message threshold voltage level. The output 116 of the third comparator 110 is indicative of data bits within the normal message. Each of the three outputs 112, 114, and 116 of the voltage comparators 106, 108, and 110 is connected to the digital layer of the controller 34.

During a normal message transmission, the output 114 of the second comparator 108 indicates the initiation and termination of the normal message frame (i.e., the start and end of the normal message). The output 116 of the third comparator 110 provides the normal message to the digital layer.

During the safing message transmission, outputs 112 and 114 of both the first and the second comparators 106 and 108 indicate the initiation and termination of the safing message frame (i.e., the start and end of the safing message). The outputs 114 and 116 of both the second and third comparators 108 and 110 provide the safing message to the digital layer. Thus, the digital layer redundantly receives the indication and the message.

It should be noted that in the illustrated example, the slave ASIC 94 contains the voltage receiver 54, the current transmitter 52, and the digital layer of the controller 34. It is to be appreciated that the ASIC 94 may be designed to only include the digital layer, with the voltage receiver 54 and current transmitter 52 located outside of the ASIC.

Figure 5:
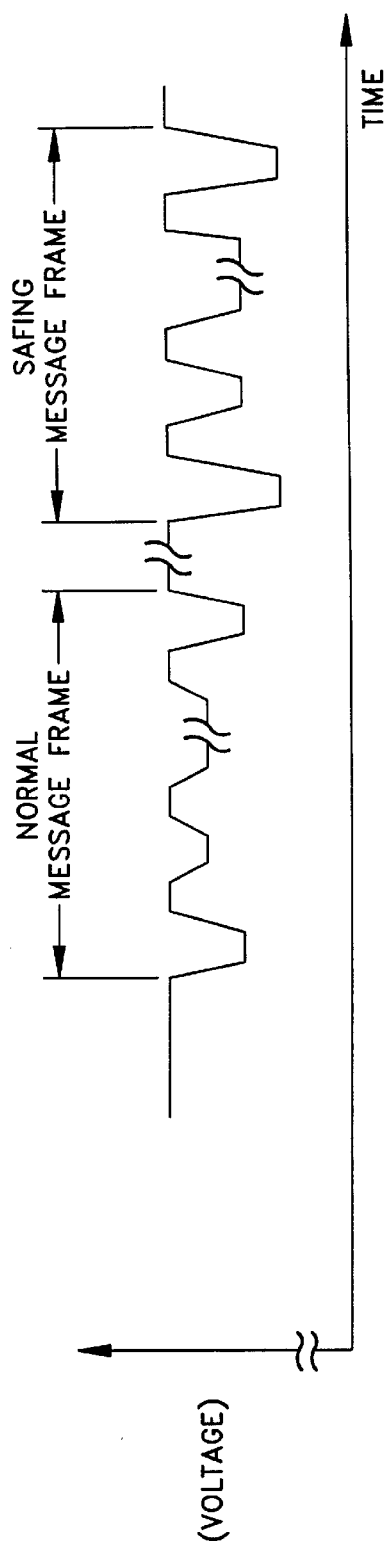
FIGS. 5 and 6 are illustrations of plots showing voltage drop and voltage rise, respectively, modulation in accordance with the present invention.
Figure 6:
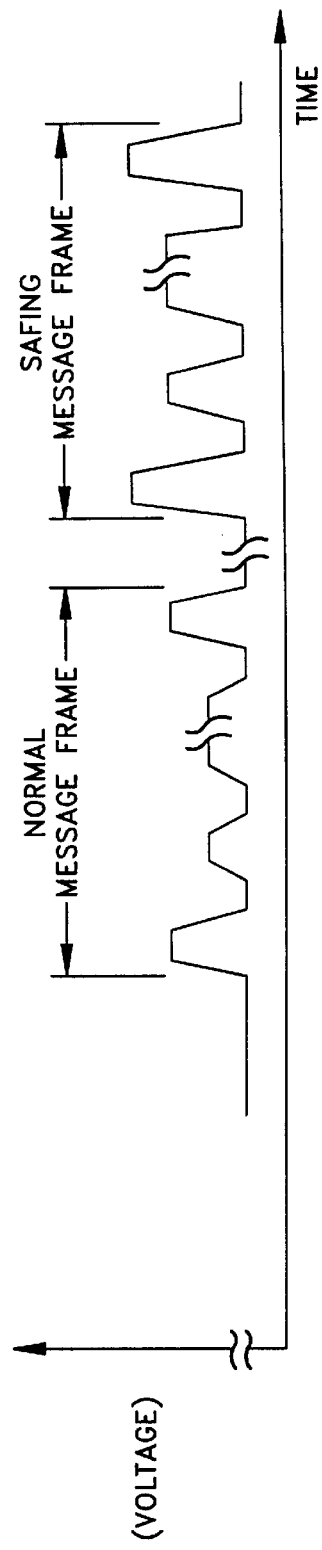

It is to be appreciated that the use of a plurality of threshold values in accordance with the present invention is not limited to the illustrated example described above. As another example, attention is directed to FIGS. 5 and 6, in which two signal types are contrasted. FIG. 5 shows a high idle signal and voltage drops for messaging (as in the previously disclosed example), but FIG. 6 shows a low idle signal and voltage rises for messaging.

From the above description of the invention, those skilled in the art will perceive improvements, changes and modifications. Such improvements, changes and modifications within the skill of the art are intended to be covered by the appended claims.

Having described the invention, the following is claimed:

1. A communication system comprising:
   an electrical conductor interconnecting a plurality of units for conducting electrical energy;
   energy supply means for providing electrical energy, having a voltage, onto said conductor;
   voltage messaging means for modulating voltage to convey messages from a first unit to a second unit via said conductor; and
   voltage receiver means for monitoring the voltage of the electrical energy to discern messages from the first unit;
   wherein said voltage messaging means includes means for adjusting voltage of the electrical energy past a first predetermined threshold to provide a first type message frame and for modulating the voltage of the electrical energy during the first type message frame to convey a first type message, and means for adjusting voltage of the electrical energy past a second predetermined threshold to provide a second type message frame and for modulating the voltage of the electrical energy during the second type message frame to convey a second type message.

2. A system as set forth in claim 1, wherein said means for adjusting voltage past a first predetermined threshold includes means for lowering the voltage past the first predetermined threshold, said means for adjusting voltage past a second predetermined threshold includes means for lowering the voltage past the second predetermined threshold, the second threshold being lower that the first threshold.

3. A system as set forth in claim 1, wherein said means for modulating the voltage during the first type message frame includes means for modulating the voltage past a first message frame threshold, said means for modulating the voltage during the second type message frame includes means for modulating the voltage past a second message frame threshold.

4. A system as set forth in claim 3, wherein said means for modulating the voltage past a first message frame threshold includes means for lowering the voltage past the first message frame threshold, said means for modulating the voltage past a second message frame threshold includes means for lowering the voltage past the second message frame threshold, the second message frame threshold being lower that the first message frame threshold.

5. A system as set forth in claim 1, wherein said means for adjusting voltage past a first predetermined threshold including means for adjusting voltage past the first predetermined threshold to provide the first type message frame as a normal message type frame to convey normal messages, said means for adjusting voltage past a second predetermined threshold including means for adjusting voltage past the second predetermined threshold to provide the second type message frame as a high priority message type frame to convey high priority-messages.

6. A system as set forth in claim 1, wherein said voltage messaging means includes means for pulse width modulating the voltage during the first and second types of message frames.

7. A system as set forth in claim 6, wherein said means for pulse width modulating includes means for conveying each bit of a message to have a logic LOW and a logic HIGH.

8. A system as set forth in claim 7, wherein said means for adjusting voltage past a first predetermined threshold includes said means for pulse width modulating that provides a logic LOW below the first predetermined threshold, said means for adjusting voltage past a second predetermined threshold includes said means for pulse width modulating that provides a logic LOW below the second predetermined threshold.

9. A system as set forth in claim 1, wherein said voltage receiver means including means for monitoring the voltage of the electrical energy to determine if the voltage passes the first predetermined threshold and the provided message is the first type message, and for monitoring the voltage of the electrical energy to determine if the voltage passes the second predetermined threshold and the provided message is a second type message.

10. A system as set forth in claim 9, wherein said means for monitoring the voltage of the electrical energy to determine if the voltage exceeds the first predetermined threshold includes a first comparator, and for monitoring the voltage of the electrical energy to determine if the voltage exceeds the second predetermined threshold includes a second comparator.

11. A system as set forth in claim 1, wherein said the first unit is a central unit and the second unit is one of a plurality of remote units, said voltage messaging means being associated with the central unit and said voltage receiver means being associated with the one of the plurality of remote units.

12. A system as set forth in claim 11, including a plurality of voltage receiver means, each being associated with one of the remote units, for monitoring the voltage of the electrical energy to discern messages from the central unit.

13. A system as set forth in claim 12, wherein each of said voltage receiver means also for deriving electrical power from the energy on said conductor to power the respective remote unit.

14. A system as set forth in claim 11, including a plurality of current messaging means, each being associated with one of the remote units, for modulating current of the electrical energy during one of the message frames to convey messages to the central unit via said conductor, including means for utilizing the modulation of voltage of the electrical energy to clock current modulation, and current receiver means, associated with the central unit, for detecting current modulations to discern messages from the remote units.

15. A system as set forth in claim 1, wherein the remote units include at least one actuatable occupant protection device for protection a vehicle occupant, the central unit controls actuation of the protection device.

16. A system as set forth in claim 15, wherein the protection device is an airbag device.

17. A system as set forth in claim 1, wherein remote units include at least one sensor device.

18. An occupant protection system for protecting a vehicle occupant, said system comprising:

an actuatable occupant protection device for protecting the vehicle occupant;

a central unit for controlling actuation of said protection device, said protection device being located remote from said central unit; and an electrical conductor interconnecting said central unit and said protection device for conducting electrical energy;

said central unit including energy supply means for providing electrical energy, having a voltage, onto said conductor and including voltage messaging means for modulating voltage to convey messages from said central unit to said protection device;

said protection device including voltage receiver means for monitoring the voltage of the electrical energy to discern messages from said central unit;

wherein said voltage messaging means includes means for adjusting voltage of the electrical energy past a first predetermined threshold to provide a first type message frame and for modulating the voltage of the electrical energy during the first type message frame to convey a first type message, and means for adjusting voltage of the electrical energy past a second predetermined threshold to provide a second type message frame and for modulating the voltage of the electrical energy during the second type message frame to convey a second type message.

19. A method of communicating between a plurality of units, said method comprising:

providing electrical energy, having a voltage, onto a conductor that interconnects the units;

adjusting voltage of the electrical energy past a first predetermined threshold to provide a first type message frame from a first unit;

modulating the voltage of the electrical energy during the first type message frame to convey a first type message from the first unit to the second unit;

adjusting voltage of the electrical energy past a second predetermined threshold to provide a second type message frame from the first unit;

modulating the voltage of the electrical energy during the second type message frame to convey a second type message from the first unit to the second unit; and monitoring the voltage of the electrical energy at the second unit to discern the message frames and the messages from the first unit.

20. A method as set forth in claim 19, wherein said step of adjusting voltage past a first predetermined threshold includes lowering the voltage past the first predetermined threshold, said step of adjusting voltage past a second predetermined threshold includes lowering the voltage past the second predetermined threshold, the second threshold being lower that the first threshold.

21. A method as set forth in claim 19, wherein said step of modulating the voltage during the first type message frame includes modulating the voltage past a first message frame threshold, said step of modulating the voltage during the second type message frame includes modulating the voltage past a second message frame threshold.

22. A method as set forth in claim 21, wherein said step of modulating the voltage past a first message frame threshold includes lowering the voltage past the first message frame threshold, said step of modulating the voltage past a second message frame threshold includes lowering the voltage past the second message frame threshold, the second message frame threshold being lower that the first message frame threshold.

* * * * *